(12) United States Patent
Ueda et al.

(10) Patent No.: US 6,621,525 B1
(45) Date of Patent: Sep. 16, 2003

(54) DOUBLE TAPERED ROLLER OF SCROLL THRUST BEARING

(75) Inventors: Koichi Ueda, Shiki-gun (JP); Masahiro Harada, Kashiwara (JP)

(73) Assignees: Koyo Machine Industries Co., Ltd., Osaka (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/720,246

(22) PCT Filed: Jul. 19, 1999

(86) PCT No.: PCT/JP99/03883

§ 371 (c)(1),
(2), (4) Date: Jan. 4, 2001

(87) PCT Pub. No.: WO00/05513

PCT Pub. Date: Feb. 3, 2000

(30) Foreign Application Priority Data

Jul. 24, 1998 (JP) ............................................. 10-225308

(51) Int. Cl.[7] ............................................... F16C 33/46
(52) U.S. Cl. ...................... 348/618; 348/450; 348/565
(58) Field of Search ................................ 348/505, 450, 348/618

(56) References Cited

U.S. PATENT DOCUMENTS 4,715,733 A    12/1987   Rood
5,846,000 A  * 12/1998   Tanishiki ..................... 348/618
5,967,672 A  * 10/1999   Akamatsu et al. ........... 348/565
6,254,277 B1 *  7/2001   Nagai et al. ................. 348/450
6,315,458 B1 * 11/2001   Unno et al. .................. 348/565
6,328,477 B1 * 12/2001   Tsujimoto et al. ........... 348/450

FOREIGN PATENT DOCUMENTS

JP          7-119741        5/1995
JP          8-6743          1/1996

* cited by examiner

*Primary Examiner*—Matthew C. Graham
(74) *Attorney, Agent, or Firm*—Rader, Fishman & Grauer PLLC

(57) ABSTRACT

In double tapered rollers of a thrust scroll bearing, a structure free from generation of edge load at both ends of a section straight line on conical or tapered surfaces, and appropriate in contact stress with the bearing race is presented. To be used as a rolling element of thrust bearing interposed between positions making relative scroll motions, it is a conical body having a pair of conical surfaces (Ra, Rb) matched coaxially and coupled at bottoms mutually, and the entire surface of the conical surfaces (Ra, Rb) is processed by crowning. As a result, edge load is not generated at both ends of the section straight line of the conical surfaces (Ra, Rb), and the maximum contact stress at the apex side is held at a low value within an allowable range.

5 Claims, 6 Drawing Sheets

(a)

(b)

DOUBLE TAPERED ROLLER OF SCROLL THRUST BEARING

TECHNICAL FIELD

The present invention relates to double tapered rollers of a scroll thrust bearings, and more particularly to a conical surface shape of double tapered rollers used as rolling elements in a scroll thrust bearing preferably employed, for example, in a thrust force support structure in a scroll type compressor.

BACKGROUND ART

The scroll type compressor is a kind of rotary compressors, and fluid compression is continuous, and as compared with the conventional reciprocating compressors, torque fluctuations and vibrations are small and high speed operation is possible, and hence it is recently applied widely.

This kind of compressor has a thrust force support structure for enabling scroll driving. This support structure is a so-called built-in type integrally incorporated in the compressor, but forms a kind of thrust bearing, and a bearing known as ball coupling used in such position has been already known as an independent machine element.

Anyway, as the rolling elements, balls such as steel balls are used, and such balls are supported in point contact state, and are hence small in load capacity and inferior in durability, and they cannot withstand long-term use in the conditions of high speed and high load, and have problems in the service life.

In this regard, as shown in FIG. 4, a scroll type compressor having plural double tapered rolling elements (double tapered rollers) as thrust force support structure has been proposed.

The scroll structure of the compressor is characterized, as shown in the drawing, by fixing a fixed scroll member (c) having a volute body (b) in a housing (a), supporting a swirl scroll member (e) having a volute body (d) engaged with the volute body (b) so as to be free to swirl or revolve by means of a thrust force support structure (f), and driving and coupling the swirl scroll member (e) to a drive source not shown through a drive shaft (h) having a crankpin (g).

This support structure (f) is formed as a kind of thrust bearing as mentioned above, and a plurality of double tapered rollers R, R, . . . , are interposed between a pair of parallel bearing races (i), (j) so as to be free to roll. The double tapered rollers R are held in a pair of pockets provided oppositely to the bearing races (i) and (j), respectively (see, for example, Japanese Laid-open Patent No. 62-274113, Japanese Laid-open Patent No. 7-119741).

By rotary driving of the crankpin (g), the swirl scroll member (e) swirls or rotates without revolving on the fixed scroll member (c), and the fluid gas sucked in from a suction port (not shown) is compressed in a compression chamber formed between the volute bodies (b, d), and discharged from a discharge port (not shown)

In this case, the double tapered rollers R captured in the pockets of bearing races (i, j) make rolling motions in the pockets to assure relative and smooth swirl of the both bearing races (i, j), and arrest relative rotation of both bearing races (i, j) (rotation of swirl scroll member (e)).

In the thrust force support structure (f) using such double tapered rollers R, R, . . . , as compared with the conventional rolling elements made of spherical bodies, the durability is improved by far, and it is possible to withstand high seed and heavy load for a longer period.

In spite of such excellent durability, the assembling and manufacturing technology of such thrust force support structure (f) is not established, and, in addition, the double tapered roller R itself has a special shape as compared with other conventional rolling elements, and it is not completed sufficiently as the rolling element for bearing. Hence, the scroll type compressor having the thrust force support structure (f) using double tapered rollers R is not put in practical use yet.

That is, the general shape of double tapered roller R, as shown in FIG. 5(a), has a pair of conical or tapered surfaces Ra, Rb, and corners of double tapered roller R (that is, both ends of generators of conical surfaces Ra, Rb) Rc, Rd are formed in a round shape, but in such shape, an edge load due to load at both ends of the section straight line (generator) is generated, and the contact stress with the bearing races (i,j) becomes excessive (see FIG. 5(b)).

For example, in FIG. 5(a), when the length L of double tapered roller R along the generator of conical or tapered surfaces Ra, Rb is 4.8 mm, the length $l_1$ of corners Rc, Rd is 0.5 mm, and the apex angle θ is 90°, by applying a thrust load to the bearing by 50 kgf per piece of double tapered rollers, the edge load occurring at the small end side of the section straight line is known to reach about 500 kgf/mm².

The invention is devised in the light of such problems of the prior art, and it is hence an object thereof to present double tapered rollers having a structure of assuring an appropriate contact stress with the bearing races, without causing edge load due to load at both ends of the section straight line on the conical surfaces.

SUMMARY OF THE INVENTION

To achieve the object, the double tapered roller of scroll thrust bearing of the invention is characterized in that a conical body has a pair of conical or tapered surfaces matched coaxially and coupled at bottoms mutually, and the entire surface of the pair of conical surfaces is processed by crowning.

In a preferred embodiment, the outer contour shape of the crowning is an arc shape having a single radius of curvature along the overall length of the generator of the conical surface, and the radius of curvature of the arc shape is set at 100 times or less of the generator length of the conical surface.

The invention is based on the results of various preceding tests and studies by the present inventor.

First, the inventor noticed that the cylindrical surface of the cylindrical roller was generally processed by crowning hitherto in order to prevent generation of edge load due to load at both ends of the section straight line (generator) (for example, Japanese Laid-open Patent No. 59-69519, Japanese Laid-open Utility Model No. 2-141723, Japanese Laid-open Patent No. 4-60215).

That is, as shown in FIG. 6, the conical or tapered surfaces Ra, Rb of the double tapered roller R were processed by crowning $C_1$, $C_1$ same as in the cylindrical surface of cylindrical roller. In this shape, however, generation of edge load at both ends of the section straight line (generator) was eliminated, but the tendency of increase of contact stress at the apex side was not improved.

For example, in FIG. 6, in the case of the length L of the double tapered roller R along the generators of the conical surfaces Ra, Rb of 4.8 mm, the length $l_1$ of the corners Rc, Rd of 0.4 mm, the length $l_2$ of crowning $C_1$ of 0.2 mm, and the apex angle θ of 90°, when a load of 50 kgf was applied per piece of double tapered rollers, the maximum contact stress at the small end side of the section straight line was found to reach about 300 kgf/mm² (the allowable maximum contact stress being 250 kgf/mm²)

On the basis of such results, further tests and studies were continued, and the invention having such constitution is realized.

In the invention, since the entire surface of the pair of conical or tapered surfaces is processed by crowning, that is, full-crowning is processed, edge load is not generated at both ends of the section straight line of the conical surfaces, and the contact stress at the apex side can be suppressed to a low value within an allowable range.

BEST MODE FOR CARRYING OUT THE INVENTION

Figure 1:
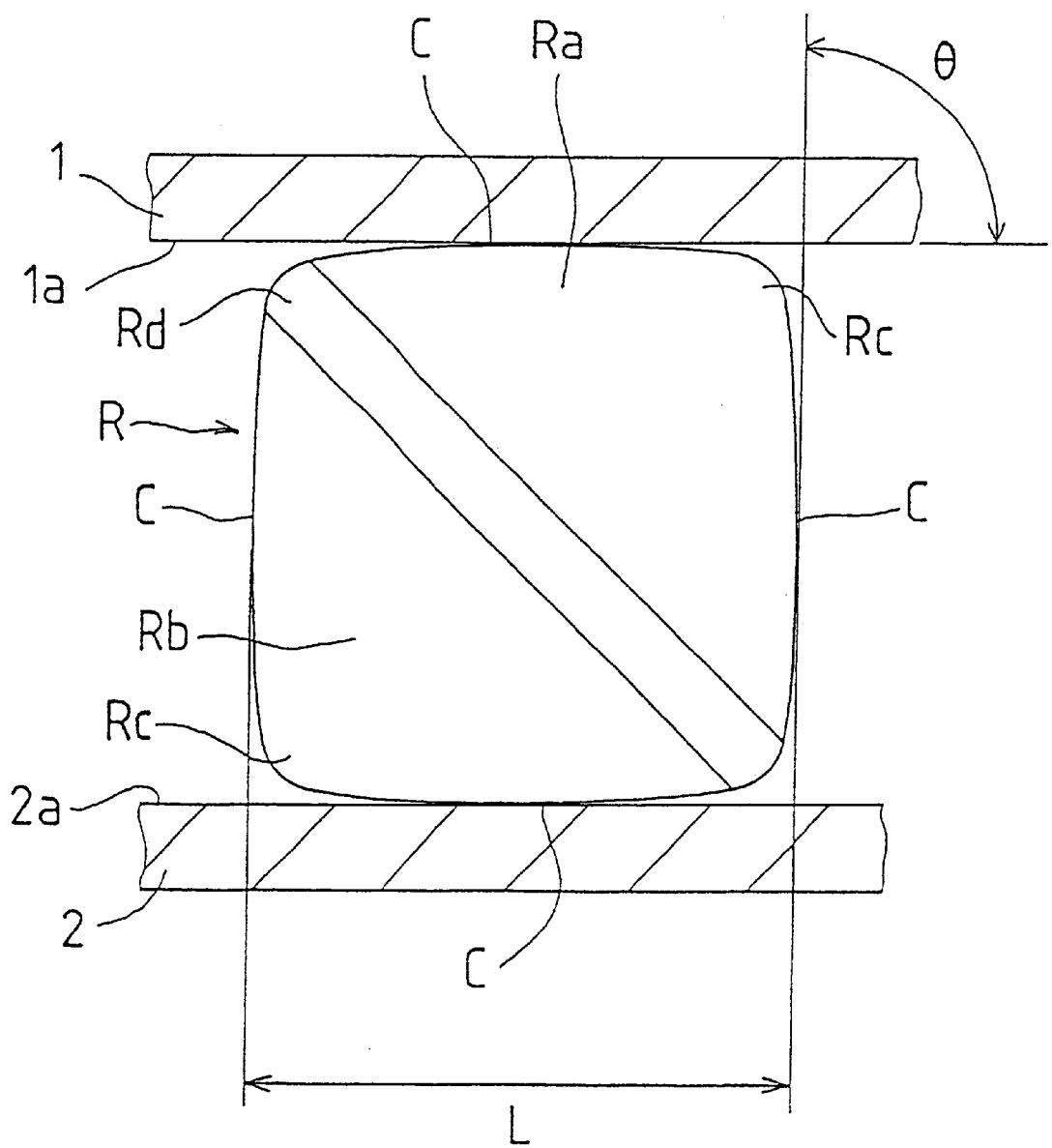
FIG. 1 is a front view showing a double tapered roller of a scroll thrust bearing in embodiment 1 of the invention.

Referring now to the drawings, preferred embodiments of the invention are described in detail below.

Embodiment 1

Figure 4:
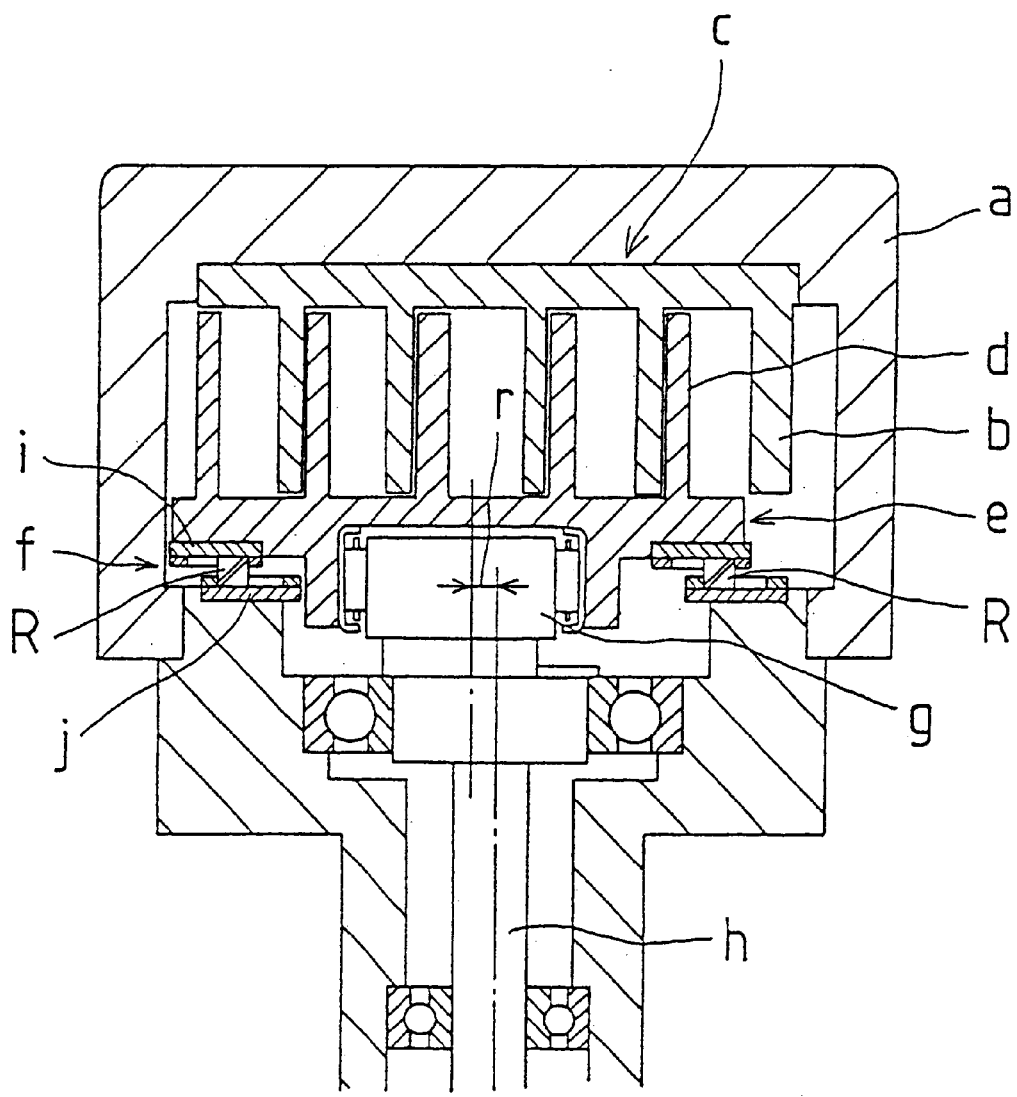
FIG. 4 is a front sectional view showing a thrust force support structure of a scroll type compressor in which the thrust roller bearing is applied.
Figure 5:
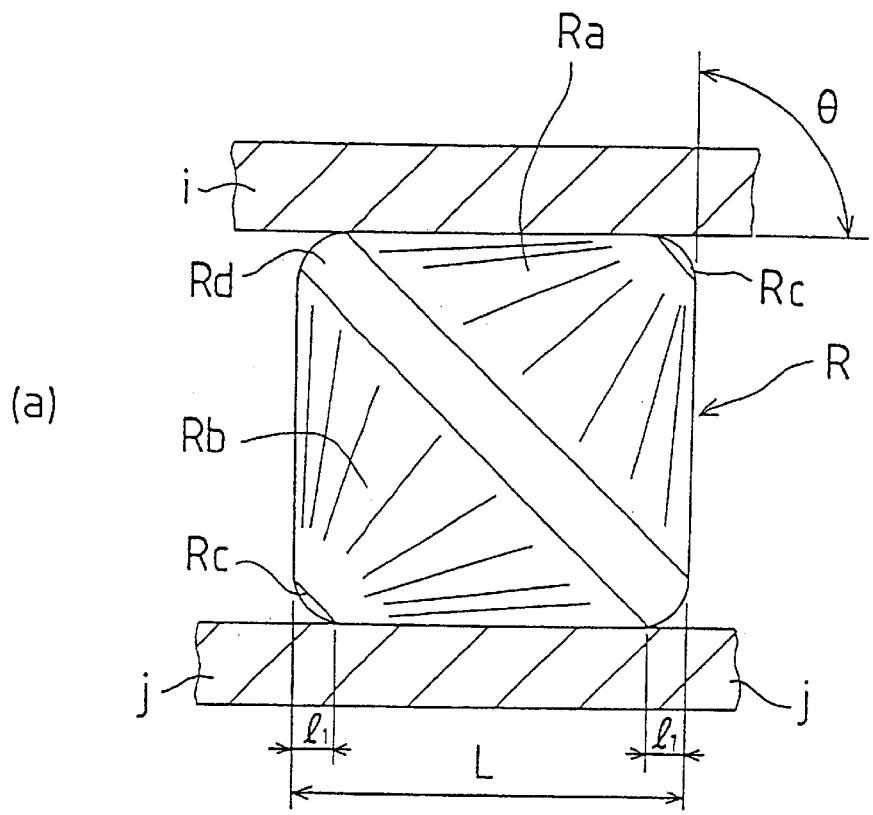
FIG. 5 shows a conventional double tapered roller used in the thrust force support structure, FIG. 5(a) being a front view and FIG. 5(b) being a diagram showing the maximum contact stress to the bearing race of the conical surface.
Figure 5:
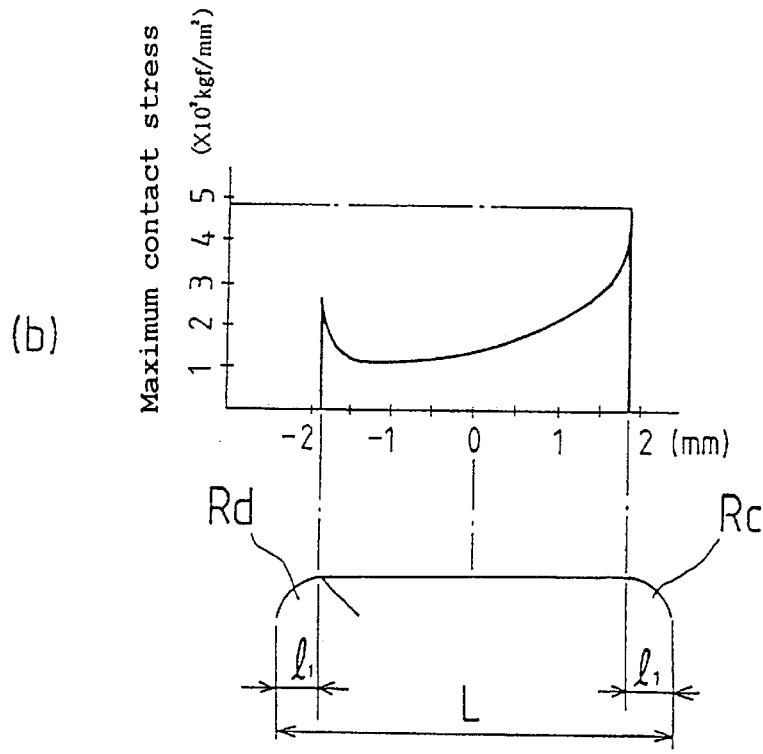
Figure 6:
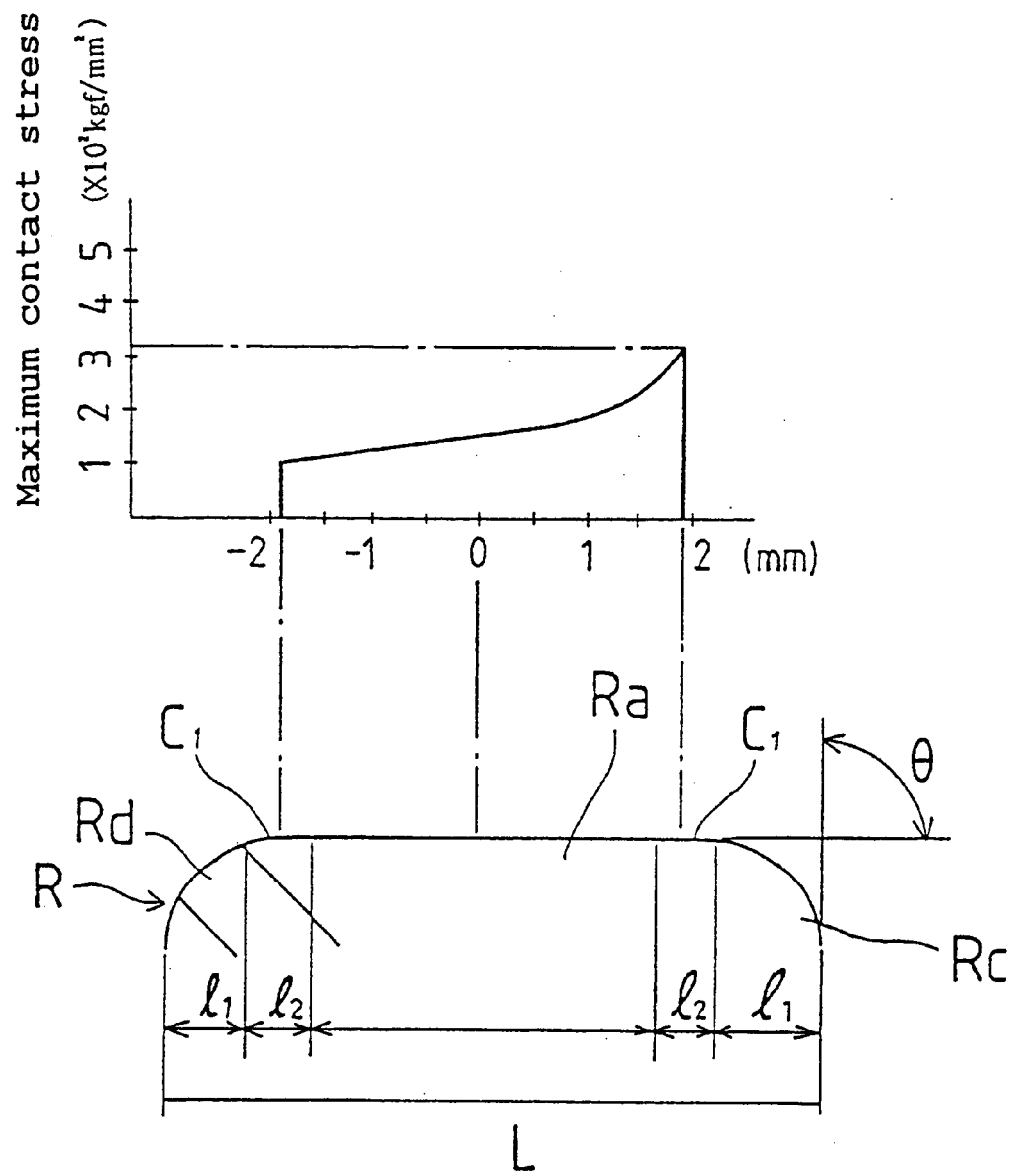
FIG. 6 is a diagram showing the maximum contact stress on the bearing race of the conical surface, by crowning the double tapered roller same as in the cylindrical roller.

A double tapered roller of a scroll thrust bearing of the invention is shown in FIG. 1, in which the double tapered roller R is specifically used in a thrust bearing preferably used as a thrust force support structure in a scroll type compressor, for example, as shown in FIG. 4.

The double tapered roller R is a conical body having a pair of conical or tapered surfaces Ra, Rb matched coaxially and coupled at the bottoms mutually, and the corners of the double tapered roller R, that is, the apex of the double tapered roller R and boundaries Rc, Rd of the both conical or tapered surfaces Ra, Rb are spherical surfaces.

The both conical surfaces Ra, Rb are rolling surfaces being finished by polishing, and the apex angle of the both apices (geometrical apex) of the double tapered roller R, that is, the conical angle θ is 90°, and hence the intersection angle of the both conical surfaces Ra, Rb is also set at 90°.

The generator length of the conical surfaces Ra, Rb, that is, the length L of the conical surfaces Ra, Rb is set equal to the scroll radius in the scroll type compressor be assembled in, and the entire surface of the conical surfaces Ra, Rb is processed by crowning C.

The outer contour shape of crowning C is an arc shape having a single radius of curvature along the overall length of the generator of the conical surfaces Ra, Rb, and the radius of curvature $r_c$ (see FIG. 2) of this arc shape is preferably set at 100 times or less of the generator length L of the conical surfaces Ra, Rb. For example, if the generator length L of the conical surfaces Ra, Rb is 4.8 mm, the radius of curvature $r_c$ of crowning C is set at 480 mm or less, for example, about 300 mm.

In thus constituted double tapered roller R, between both bearing plates 1, 2, one conical surface Ra rolls on the raceway 1a of the bearing race 1, and other conical surface Rb rolls on the raceway 2a of the bearing race 2.

In the double tapered roller R of the embodiment, the contact stress with the bearing races 1, 2 was investigated.

Figure 2:
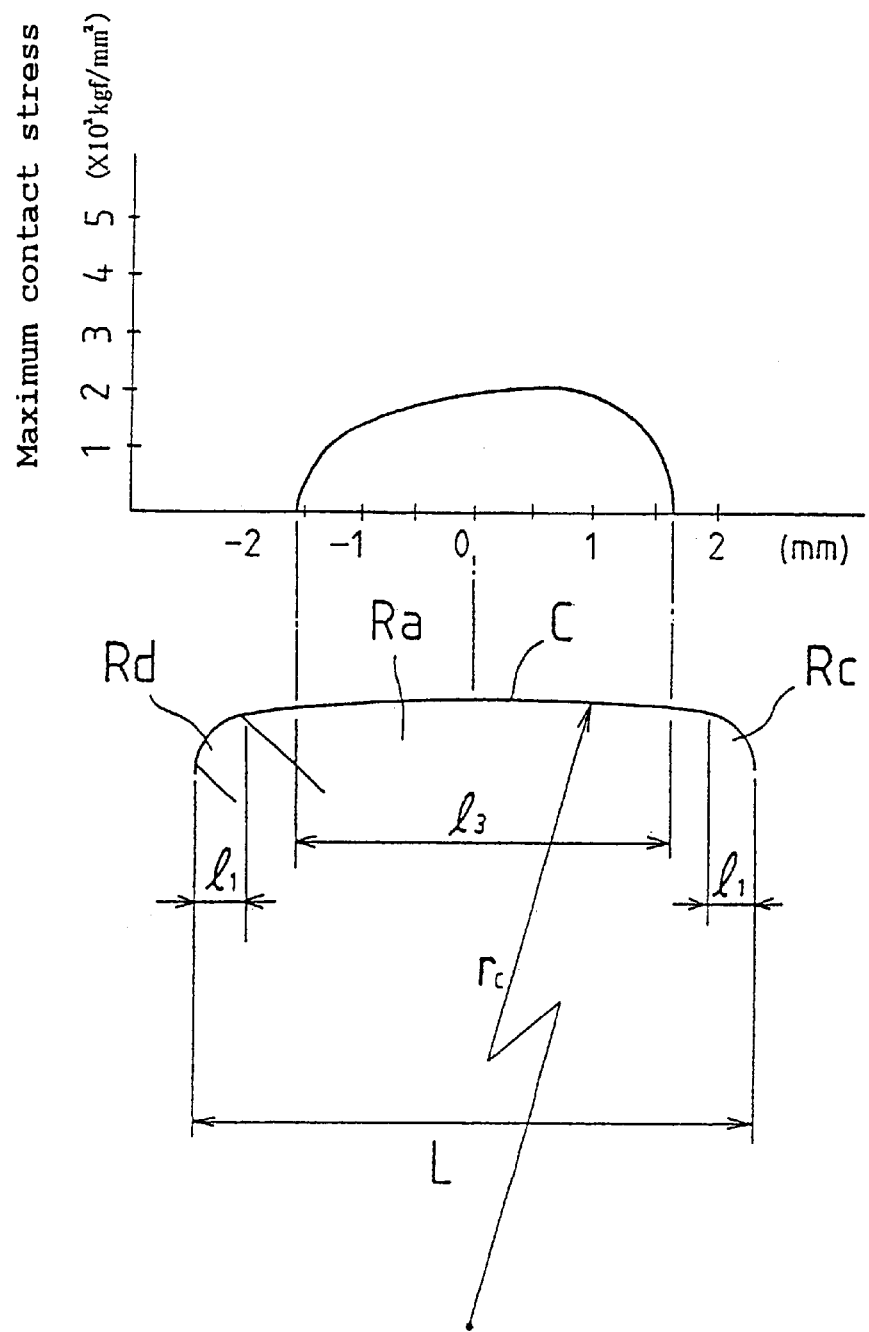
FIG. 2 is a diagram showing the maximum contact stress on the bearing race of the conical surface of the double tapered roller.

The sample of the double tapered roller R is shown in FIG. 2, in which the length L of the double tapered roller along the generator of the conical surfaces Ra, Rb is 4.8 mm, the length $l_1$ of corners Rc, Rd is 0.5 mm, the radius of curvature $r_c$ of arc shape of crowning C is about 300 mm, and the apex angle θ is 90°.

A plurality of double tapered rollers R in such standard dimensions were arranged between the pair of bearing plates 1, 2, and a thrust load was applied to this thrust bearing by 50 kgf per piece of double tapered rollers R, and, as a result, the maximum contact stress at the small end side in the contact region $l_3$ of the section straight line was bout 200 kgf/mm², which was proved to be within an allowable range (allowable maximum contact stress 250 kgf/mm² or less).

Embodiment 2

Figure 3:
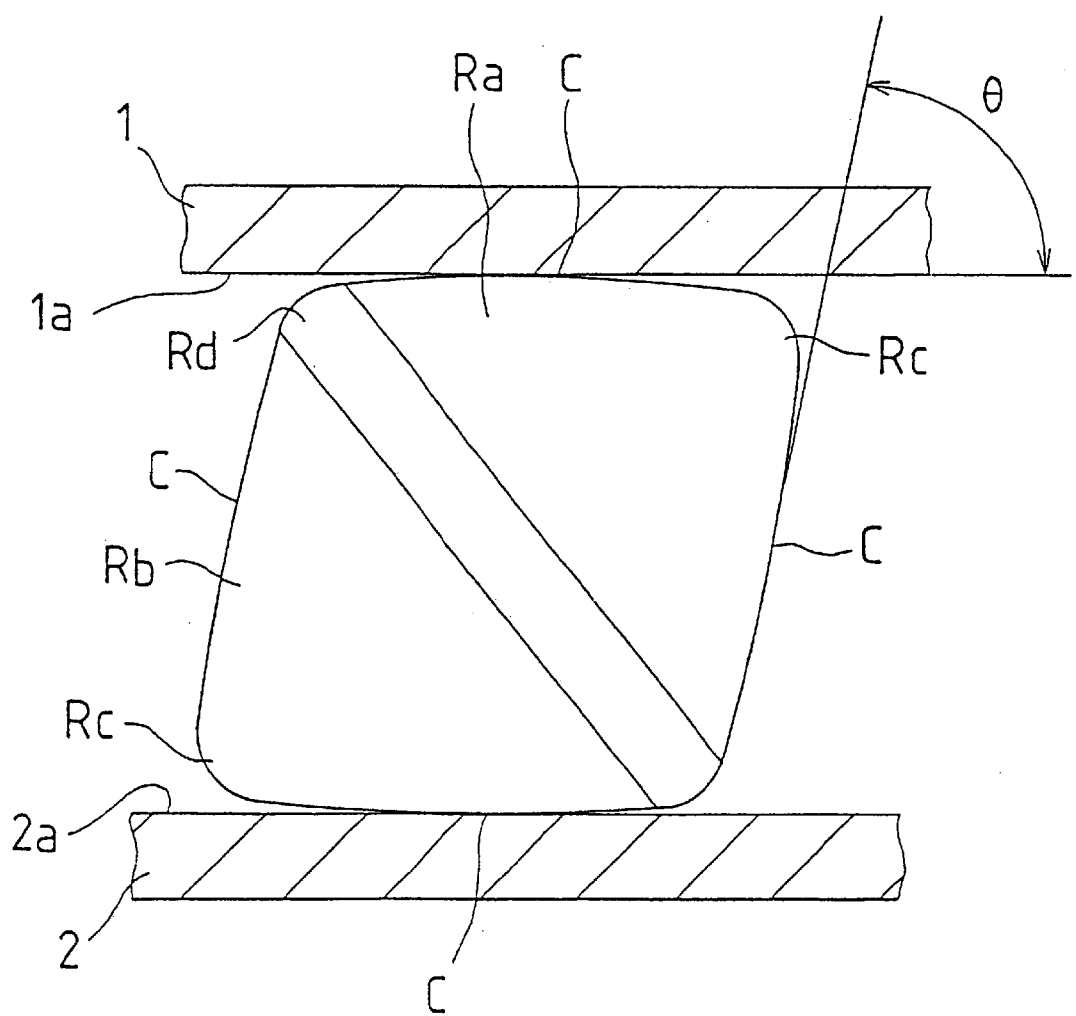
FIG. 3 is a front view showing a double tapered roller of a scroll thrust bearing in embodiment 2 of the invention.

This embodiment is shown in FIG. 3, in which the double tapered roller R of the embodiment is designed so that the load applied to the conical surfaces Ra, Rb may be biased to the large end side of the conical surface in a state being assembled in a scroll thrust bearing.

More specifically, the apex angle θ of the double tapered roller R is set at 80° to 85°, in order words, the relation between oscillation radius r of the scroll thrust bearing and swirl radius $r_0$ of double tapered roller R is set at $r_0$=0.98 r to 0.998 r.

Herein, the oscillation radius r of the scroll thrust bearing refers to the eccentricity of the crankpin (g) to the drive shaft (h) for oscillating the scroll thrust bearing, and the swirl radius $r_0$ of the double tapered roller R refers to the radius of the circle drawn by the apex (geometrical apex) of one conical surface Ra or Rb when other conical surface Rb or Ra of the conical body for composing the double tapered roller R rolls on a plane.

In thus constituted double tapered roller R, as shown in the drawing, between the both bearing plates 1 and 2, one conical surface Ra rolls on the raceway 1a of the bearing race 1, and other conical surface Rb rolls on the raceway 2a of the bearing race 2, and when the bearing is assembled, the load applied to the conical surfaces Ra, Rb is biased to the large end side of the conical surfaces Ra, Rb, and as compared with the double tapered rollers of embodiment 1, it is more effective to prevent the peak of the maximum contact stress from concentrating at the apex side.

The other constitution and action are same as in embodiment 1.

The foregoing embodiments 1 and 2 are preferred examples of the invention, and the invention is not limited to them alone, but may be changed and modified in various designs within the scope thereof.

For example, the specific crowning shape of the double tapered roller R is not limited to the illustrated embodiments alone as far as the above basic conditions are satisfied (the radius of curvature $r_c$ of arc shape of crowning is 100 times or less of the generator length of conical surfaces Ra, Rb, the apex angle θ of conical body is 90° or less)

INDUSTRIAL APPLICABILITY

As described herein, the double tapered roller of the invention is a conical body having a pair of conical surfaces matched coaxially and coupled at bottoms mutually, and since the entire surface of the pair of conical surfaces is processed by crowning, that is, full-crowning, edge load due to load is not generated at both ends of the section straight line in the pair of conical surfaces, and the contact stress with the bearing race at the apex is controlled at an appropriate value within the allowable range.

Therefore, a completed double tapered roller as a rolling element for bearing is presented, and the scroll thrust bearing using double tapered rollers can be practically realized, so that its excellent durability may be effectively exhibited.

In particular, as measure for improvement of the recent global environments, the scroll type compressor is intensively developed as the product applicable to propane or other refrigerant, replacing the conventional chlorofluorocarbons, and the scroll thrust bearing using the double tapered rollers of the invention is excellent in durability, and withstands high speed and heavy load for a longer period, and hence it is ideal as the thrust force support structure of the scroll swirl unit in this kind of compressor. Therefore, the scroll thrust bearing for thrust force support structure having double tapered rollers, hitherto being delayed in development, and the scroll type compressor comprising such support structure may be put in practical use, and manufactured in mass production.

What is claimed is:

1. A double tapered roller of scroll thrust bearing being used as a rolling element of a thrust bearing interposed between positions making relative scroll motions, comprising:

a conical body having a pair of conical surfaces matched coaxially and coupled at bottoms mutually, wherein an entire surface of said pair of conical surfaces is processed by crowning, an outer contour shape of said crowning is an arc shape having a single radius of curvature along substantially an overall length of a generator of said conical surfaces and the radius of curvature of the arc shape of said crowning is set at 100 times or less of a generator length of the generator of said conical surfaces.

2. The double tapered roller of scroll thrust bearing of claim 1, wherein an apex angle of said conical body is set at 90° or less.

3. The double tapered roller of scroll thrust bearing of claim 1, wherein a load applied to said conical surfaces is biased to a large end side of the conical surfaces in a state being assembled in the scroll thrust bearing.

4. The double tapered roller of scroll thrust bearing of claims 3, wherein a relation between an oscillation radius r of the scroll thrust bearing and a swirl radius $r_0$ of said conical body as defined below is set in a range of $r_0 = 0.98$ r to 0.998 r, wherein the oscillation radius r connotes an eccentricity of a drive shaft for oscillating the scroll thrust bearing and the swirl radius $r_0$ connotes a radius of a circle drawn by a geometrical apex of one conical surface when the other conical surface of the conical body rolls on a plane.

5. The double tapered roller of scroll thrust bearing of claim 1, wherein an apex angle of said conical body is set at 80° to 85°.

* * * * *